(12) United States Patent
Ekchian

(10) Patent No.: US 8,510,966 B2
(45) Date of Patent: Aug. 20, 2013

(54) METHOD AND APPARATUS FOR HYSTERESIS REDUCTION IN DISPLACEMENT OF SENSORS

(76) Inventor: Jack A. Ekchian, Belmont, MA (US)

( * ) Notice: Subject to any disclaimer, the term of this patent is extended or adjusted under 35 U.S.C. 154(b) by 317 days.

(21) Appl. No.: 13/065,789

(22) Filed: Mar. 30, 2011

(65) Prior Publication Data

US 2011/0239476 A1    Oct. 6, 2011

Related U.S. Application Data

(60) Provisional application No. 61/341,351, filed on Mar. 30, 2010.

(51) Int. Cl.
*G01C 9/16*    (2006.01)

(52) U.S. Cl.
USPC ........................................ 33/366.13; 33/356

(58) Field of Classification Search
USPC ......... 33/356, 357, 358, 359, 366.13, 366.15, 33/366.19, 366.25
See application file for complete search history.

(56) References Cited

U.S. PATENT DOCUMENTS

| | | | |
|---|---|---|---|
| 1,637,445 A | | 8/1927 | Franklin |
| 3,337,789 A | | 8/1967 | Ono et al. |
| 3,906,471 A | | 9/1975 | Shawhan |
| 4,345,473 A | | 8/1982 | Berni |
| 4,624,140 A | | 11/1986 | Ekchian et al. |
| 4,644,662 A | | 2/1987 | Anderson et al. |
| 4,912,662 A | | 3/1990 | Butler et al. |
| 5,010,653 A | * | 4/1991 | Fowler ............................ 33/356 |
| 5,083,383 A | | 1/1992 | Heger |
| 5,992,032 A | * | 11/1999 | Chiang et al. ............. 33/366.25 |
| 6,249,984 B1 | * | 6/2001 | Barsky et al. ............. 33/366.15 |
| 6,957,156 B2 | * | 10/2005 | Jo et al. ............................ 33/356 |
| 7,769,539 B2 | * | 8/2010 | Okeya ............................... 33/356 |
| 2006/0090358 A1 | * | 5/2006 | Campbell et al. ............... 33/356 |
| 2010/0121599 A1 | * | 5/2010 | Boeve et al. .................... 33/356 |

* cited by examiner

*Primary Examiner* — G. Bradley Bennett

(57) ABSTRACT

A method and apparatus are provided for improving the performance of displacement sensors, including inclinometers, accelerometers and linear position transducers, by reducing hysteresis.

10 Claims, 9 Drawing Sheets

METHOD AND APPARATUS FOR HYSTERESIS REDUCTION IN DISPLACEMENT OF SENSORS

CROSS-REFERENCE TO RELATED APPLICATIONS

This application claims priority of U.S. Provisional Patent Application No. 61/341,351, entitled "Sensors with reduced hysteresis", filed Mar. 30, 2010, which is hereby incorporated by reference in its entirety.

FIELD OF INVENTION

The present invention generally relates to a method and apparatus for reducing hysteresis in displacement sensors such as, for example, inclinometers, accelerometers and linear position transducers. More particularly, the invention relates to such a method and apparatus wherein controlled and constrained motion is imparted to the sensor's sensing unit relative to the sensor base or housing during use.

BACKGROUND

The performance of sensors, such as displacement sensors, is frequently degraded by hysteresis. Displacement sensors may be absolute sensors such as certain inclinometers and accelerometers that measure the inclination or acceleration of the housing or enclosure of the sensor with respect to the earth or other inertial reference frame. Displacement sensors may also be used to measure the relative displacement between two or more points. Such sensors may be physically connected to such points or may rely on, for example, magnetic or electric fields or electromagnetic or acoustic waves to link to such points.

Displacement sensors typically comprise a base and certain sensing elements, within a sensing unit, that are immovably connected to the base. Displacement sensors, such as for example inclinometers, also contain certain sensing elements, within the sensing unit, that may move relative to the base as a result of motion that is imparted to the base. The relative motion between these two types of elements within the sensing unit is typically measured and used to determine the displacement of the base.

If an ideal error-free displacement sensor, such as a single axis inclinometer with sufficient range and without hysteresis, underwent exactly a 25 degree clockwise change in inclination about its sensitive axis followed by a counterclockwise change in inclination of exactly 25 degrees about the same axis, the sensor would indicate a net change in inclination of precisely zero degrees. However, due to hysteresis, conventional displacement sensors typically cannot perform in this manner.

The present applicant was a co-inventor of an invention described in U.S. Pat. No. 4,624,140 the contents of which are included herein by reference in their entirety. An inclinometer disclosed in that patent comprises a sensing unit comprising a spherical vessel, partially filled with a conductive liquid, with conductive wall segments at least one of which is coated with a thin dielectric coating. In use, when the inclination of such an inclinometer is varied, the conductive liquid covers a variable portion of at least one dielectric coated wall segment. The capacitance between the conductive liquid and the coated wall segment varies as function of the inclination of the base of the device. An alternate capacitive sensor, which uses a low conductivity liquid as the dielectric of a capacitor, is disclosed in U.S. Pat. No. 3,906,471, the contents of which are included herein by reference in their entirety. U.S. U.S. Pat. Nos. 4,912,662 and 5,083,383, the contents of which are included herein by reference in their entirety, also describe other configurations of inclinometers. Generally, the accuracy of inclinometers and other displacement sensor technologies, with and without liquid sensing elements, are limited by hysteresis.

The sensing units in displacement sensors typically have components that are immovably fixed to the housing or base of the sensor and others that are free to move or have the propensity to move relative to the housing or base when the sensor is displaced. The relatively fixed elements in the sensing unit of the inclinometer disclosed in U.S. Pat. No. 4,624,140 comprise the vessel and the conductive wall segments. The conductive liquid, on the other hand, is a movable element within the sensing unit that moves relative to the housing of the sensor or the sensor base when the housing and base are displaced.

Displacement sensors are typically configured to be sensitive to a single input. For example, an inclinometer is typically configured to measure only changes in inclination of its base. Although, a two dimensional sensor may be used to measure an inclination change in two dimensions, the only input that can typically be measured with such a device is change in inclination of the base or housing.

U.S. Pat. No. 1,637,445, the contents of which are included herein by reference in their entirety, describes the use of a liquid filled, shaft mounted, variable capacitor attached to a turning knob of a radio. Such a device cannot be used as an inclinometer because the output of the variable capacitor is sensitive to two different inputs, namely the inclination of the base of the radio and the rotation of knob 25 in FIG. 1 of the patent. In such a device, the output of the capacitance is the result of an indeterminate combination of the inclination of the base and the rotation of the knob.

SUMMARY OF INVENTION

It is an object of present invention to improve the accuracy of displacement sensors by reducing or eliminating errors caused by hysteresis.

It is another object of this invention to compensate for the error caused by hysteresis in the use of a displacement sensor.

It is yet another object of this invention to configure a displacement sensor to produce a calibrated output that may be used to measure the displacement of its base, but which also comprises a mechanism for producing a prescribed determinate displacement, of the sensing unit of the sensor, relative to the sensor base. The induced relative motion between the sensing unit and the sensor base is more preferably of a predetermined magnitude and timing which is automatically implemented. It is further preferred, that the net induced motion of the sensing unit relative to the base is zero. Therefore, the position of the "fixed" elements with respect to the sensor base after the induced motion is the same as it was prior to it. Alternatively, if the net relative displacement is not zero, it is necessary that the net relative displacement and its effect on the sensor output be ascertainable. The base of the sensor is typically used to attach the sensor to a surface the displacement of which is to be measured.

An inclinometer may, for example, be configured so that in the case of changes in inclination about a sensitive axis, clockwise changes may be determined without any induced motion between the base and the sensing unit. In the case of counterclockwise changes in inclination, mechanisms within the sensor housing may automatically cause the sensing unit to undergo a predetermined additional counterclockwise change in inclination followed by an equal amount of clockwise change relative to the sensor base. Once these predetermined induced changes are completed, the measurement of inclination is obtained. In this manner, the sensing unit of such a sensor is always moving in the same direction, i.e. clockwise, prior to a reading, regardless of the overall direction of displacement of the sensor base. The effect of hysteresis is consequently reduced or eliminated. It is preferred that the magnitude of the predetermined relative displacement internal to the sensor be at least equal to or greater than the maximum error that would otherwise be caused by hysteresis.

It is a further object of this invention to reduce or eliminate the effect of hysteresis by inducing vibration or oscillation of the sensing unit relative to the base. It is preferred that the magnitude of oscillations be equal or greater in magnitude than the maximum error due to the hysteresis. It is further preferred that the vibration or oscillation be stopped prior to obtaining a reading from the sensor.

It is a yet another object of this invention to induce a predetermined displacement to the normally movable components in the sensing unit relative to the sensor base prior to obtaining a reading from the sensor. For example, in the case of a liquid filled capacitive sensing unit as disclosed in U.S. Pat. No. 4,624,140, the conductive liquid may be agitated directly and independently of the motion of the sensor base.

DETAILED DESCRIPTION OF INVENTION

Figure 1A:
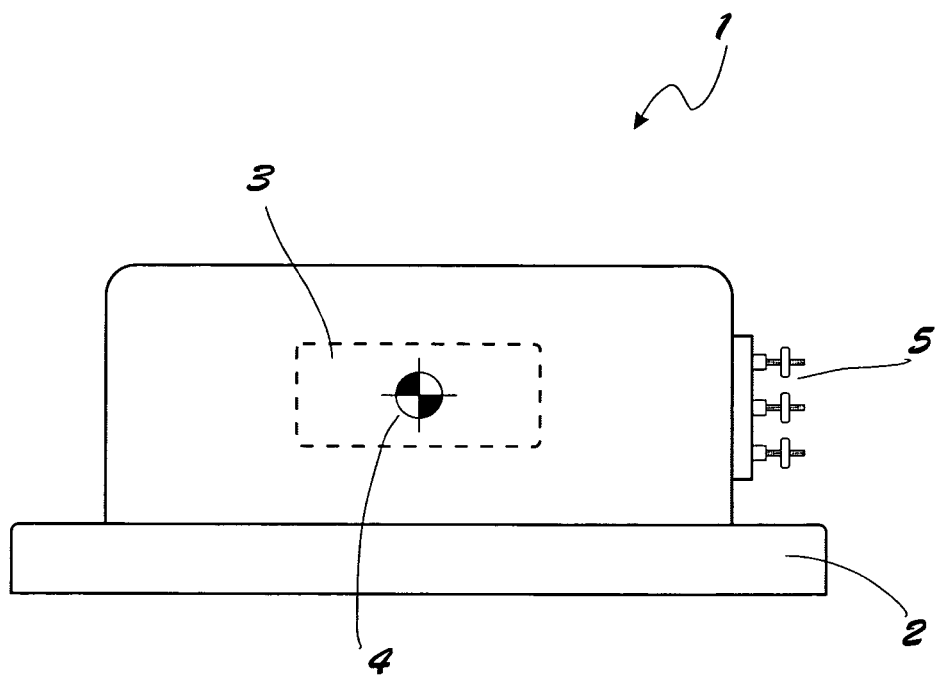
FIG. 1 is a schematic of a conventional displacement sensor with sensing unit.

FIG. 1a shows a conventional inclinometer 1 with base 2 and sensing unit 3 with axis of sensitivity 4 and terminals 5 for power input, ground and signal out. The base is typically used to attach the sensor to a surface of another object where the displacement of the surface is to be measured. The sensing unit is immovably attached to the base.

Figure 1B:
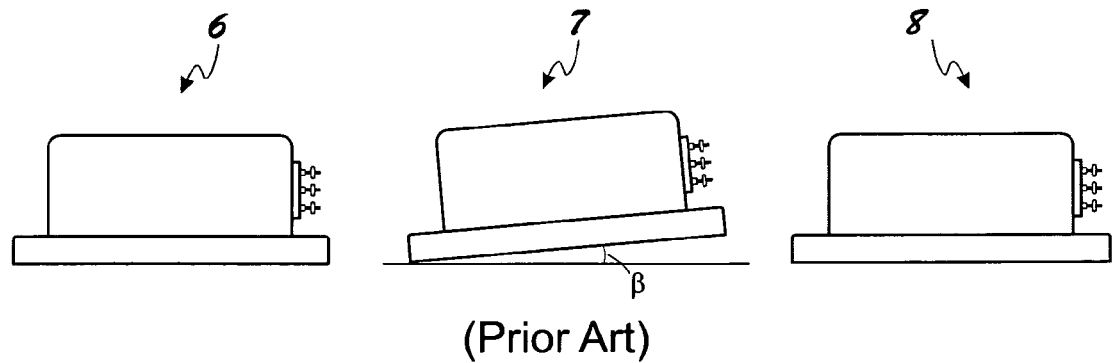
Figure 1C:
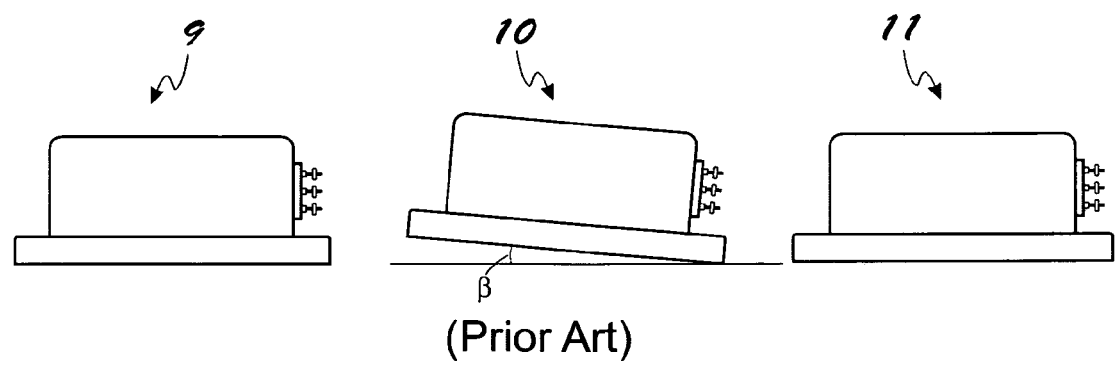

FIG. 1b shows the inclinometer of FIG. 1 undergoing a sequence of changes in inclination. It starts from a horizontal position 6, followed by a counterclockwise (CCW) or negative change 7 of β degrees and then returns to a horizontal position 8. Typically, the reading of the sensor output in position 8 does not return to the reading obtained in position 6 because of hysteresis. In FIG. 1c, the inclinometer again starts from a horizontal position 9 and undergoes a change of β degrees in the clockwise (CW) direction 10 and again returns to a horizontal position 11. Again, the reading in position 9 produced by an inclinometer typically does not match the reading in position 11. Even if the output of the sensor starts at the same value in positions 6 and 9, typically, the absolute value of the reading at position 7 compared to that at position 10 and the value at position 8 compared to that at position 11 will be different due to hysteresis. In fact, if the angle β is small enough, the output of the sensor in FIG. 1b may not change at all, due to hysteresis, as the sensor transitions between position 6 and 7 and 7 and 8.

Figure 2:
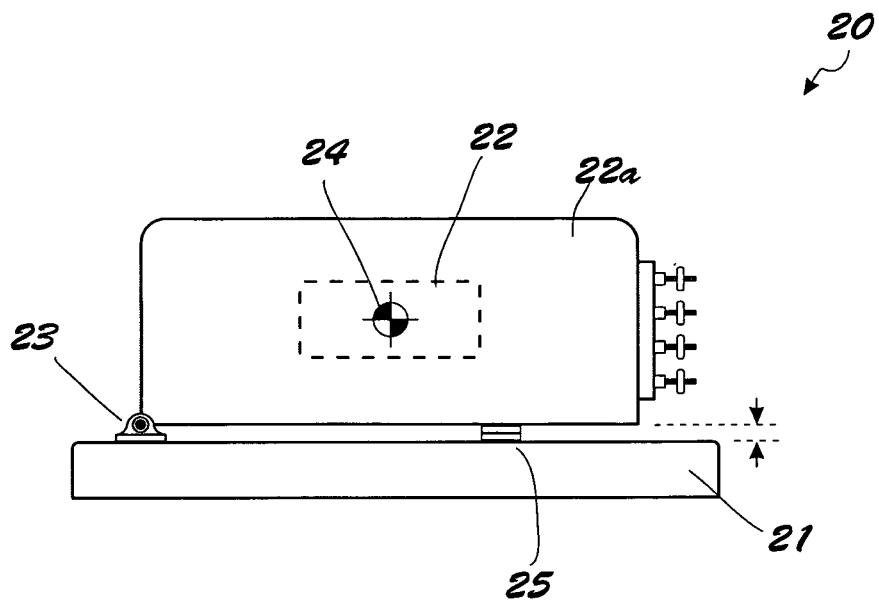
FIG. 2 is a schematic of an embodiment of the invention with an actuator for moving the sensing unit relative to the sensor base.

FIG. 2 shows an inclinometer 20 with sensor base 21 and sensing unit 22 within assembly 22a. Also shown is a hinge or pivot 23 that permits the sensing unit and assembly 22a to be moved relative to the sensor base, i.e. rotated by a controlled amount about the axis of sensitivity 24 even when the base remains fixed. It is preferred that the relative movement between the sensing unit and the housing base 21 be controlled by actuator 25 which may be, for example, a piezoelectric stack, a cam mechanism, a worm gear drive or a rack and pinion device. The actuator may also comprise a linear or rotary drive with mechanical, electric pneumatic or hydraulic jacks, or a linear motor.

The actuator may be used to minimize the effect of hysteresis by, for example, causing movement of the sensing unit relative to the base for certain displacements, to always be in a predetermined direction just before a reading is taken. It is preferred that the net motion induced by the actuator not add or subtract from the total displacement of the sensing unit caused by displacement of the base. It is further preferred that the change in position induced by the actuator also be of a predetermined magnitude such that its effect on the sensing unit output is equal to or larger than the maximum error otherwise due to hysteresis. The base may be located in any convenient location with respect to assembly 22a. For example, base 21 may be attached to the side or top of assembly 22a.

Figure 3:
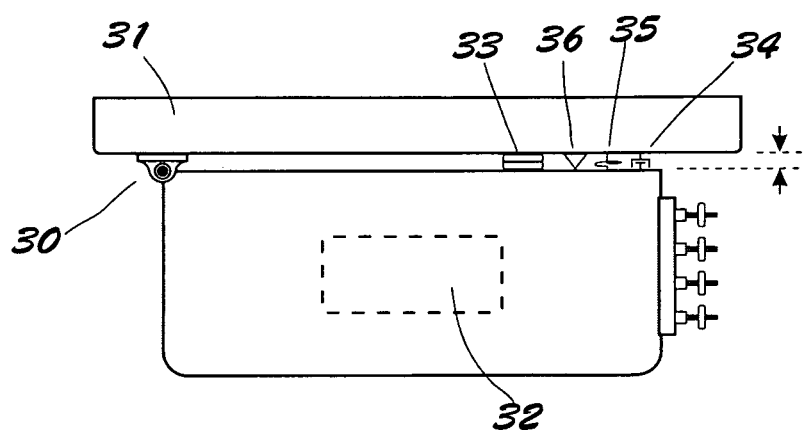
FIG. 3 is a schematic of another embodiment of the invention wherein the induced motion between the sensing unit and the base is controlled and constrained by components including a spring, a damper and a stop.

The motion of the sensing unit relative to the enclosure base may be limited by using stops so as to ensure that the net induced motion is exactly zero. FIG. 3 shows another embodiment of an inclinometer according to the present invention. The relative motion of the sensing unit with respect to the sensor base 31 may be constrained by a hinge 30, a damping mechanism 34, a spring mechanism 35 and a stop 36. Relative motion of the sensor unit 32 with respect to base 31 may be induced by actuator 33.

Figure 4B:
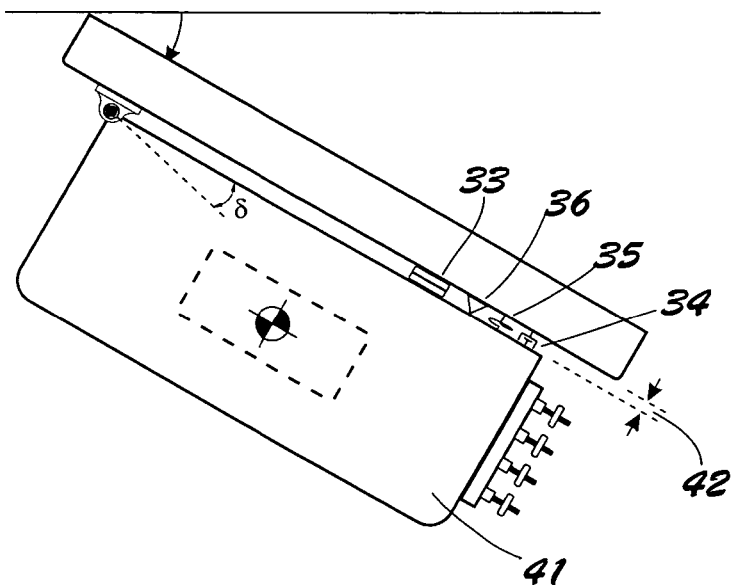
FIG. 4 is a schematic of the embodiment illustrated in FIG. 3 shown undergoing clockwise and counterclockwise displacements.
Figure 4A:
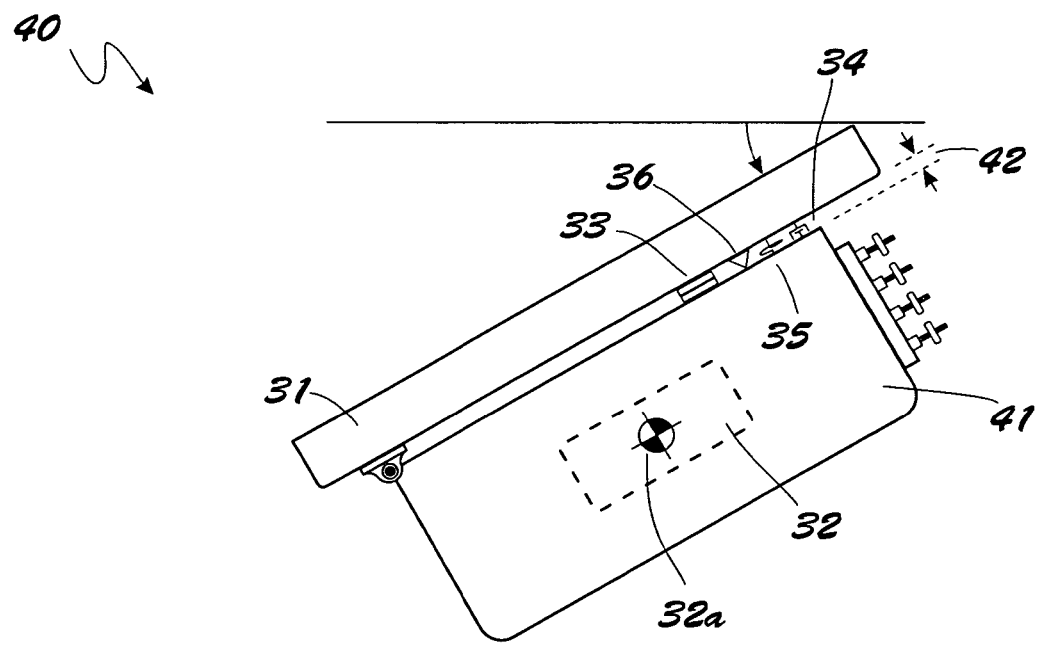

FIG. 4a shows an inclinometer with base 31, sensing unit 32, and axis of sensitivity 32a. The inclinometer base has undergone a rotation, or change in inclination, of 30° in the CCW or negative direction. In this embodiment, the base 31 and the assembly 41 that holds the sensing unit 32 are held together and move as one piece during a CCW displacement. The actuator 33 remains inactive and spring 35 holds assembly 41 firmly against stop 36. Since the base 31 and assembly 41 move as one piece, distance "y" 42 remains unchanged.

FIG. 4b shows the inclinometer undergoing a 30° CW or positive change in inclination. However, before the reading is taken, the actuator is activated and the assembly 41 is rotated through an angle δ° in the CW or positive direction followed by an angular displacement of δ° in the CCW or negative direction such that the assembly 41 again rests against stop

36. During this actuator induced motion, the speed of relative angular displacement may be controlled by a combination of the actuator 33, the spring 35 and damper 34. In this case, the distance "y" 42 increases and then returns to the same value as in FIG. 4*a*. It is preferred that the angular displacement is equal to or larger than the maximum angular error normally resulting from hysteresis when no corrective action is taken. Alternatively, the sequence of CW and CCW relative displacements of δ° of the sensing unit may be induced even if the sensor output prior to the reading is in the CW direction or no displacement is detected by the sensing unit.

Figure 5:
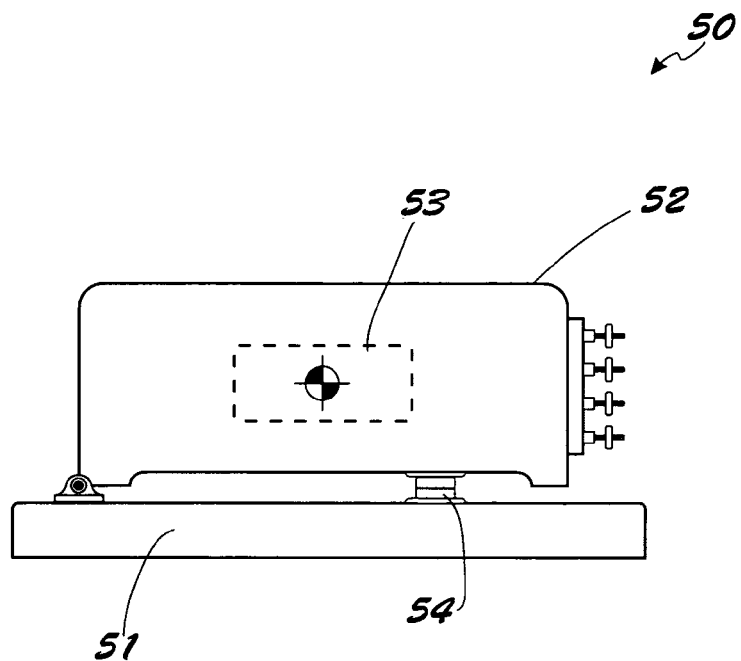
FIG. 5 is a schematic of a further embodiment of a displacement sensor wherein actuator is used to induce vibration of sensing unit with respect to the sensor base.

FIG. 5 shows an inclinometer 50 with base 51 and assembly 52 comprising the sensing unit 53. In this embodiment, the actuator 54 oscillates or vibrates the assembly 52 with respect to the base 51 at a predetermined frequency and amplitude. Readings are preferably taken at the same point in time during the period of oscillation or vibration. In this embodiment, the actuator 54 is preferably attached to both base 51 and assembly 52.

Figure 6A:
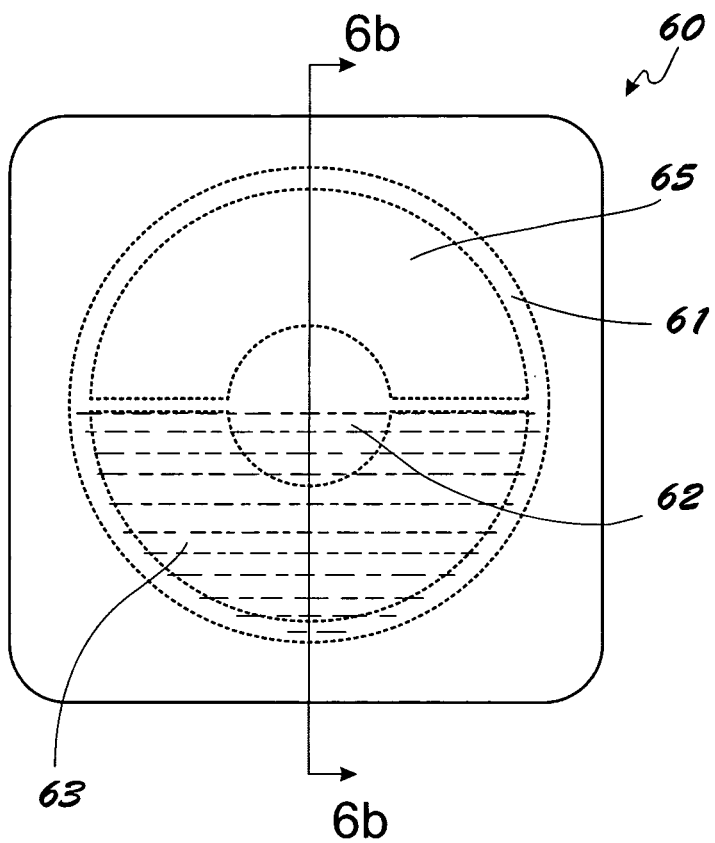
FIG. 6 is a schematic of a sensing unit of an inclinometer comprising liquid filled capacitors.
Figure 6B:
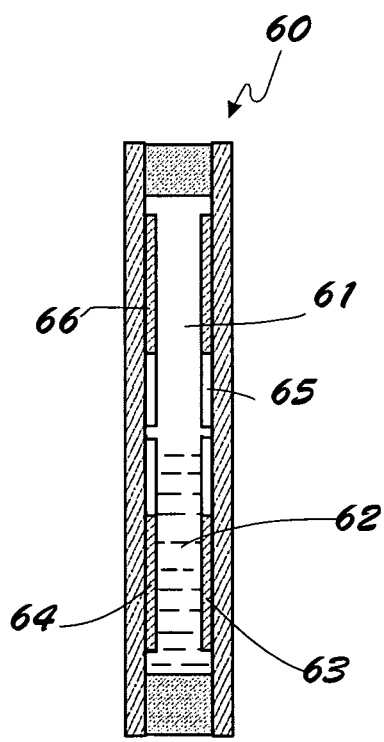

FIG. 6*a* shows a schematic of an inclinometer sensing unit 60 that may be used in displacement sensors such as illustrated in FIG. 2 or FIG. 3. The sensing unit comprises a vessel 61 partially filled with a conductive liquid 62 and dielectric coated wall segment 63. FIG. 6*b* shows a section view of the sensing unit. In the position shown, the conductive liquid completely covers the lower dielectric coated wall segments 63 and 64. The conductive coated wall segments 65 and 66 are not covered by the conductive liquid. In FIGS. 6*a* and 6*b*, the capacitances between each of the wall segments 63 and 64 and the liquid are at a maximum value while the capacitances between each of the wall segments 65 and 66 and the liquid are at their minimum value.

During use of this sensing unit in a displacement sensor, the vessel walls including the conductive wall segments 63, 64, 65 and 66 are preferably maintained in a predetermined or fixed relationship with respect to the sensor base when the output reading is obtained. These elements remain fixed relative to the base of the sensor unless moved by, for example, actuator 25 in FIG. 2. It is further preferred that the net relative movement with respect to the base caused by the actuator be zero prior to when a reading of the sensing unit output is taken.

Figure 7:
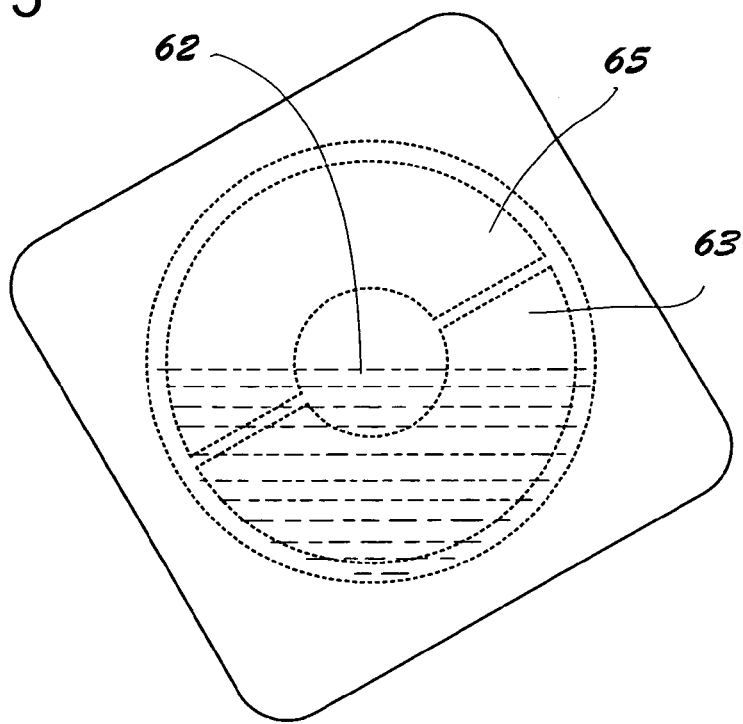
FIG. 7 is a schematic of the sensing unit of FIG. 6 displaced 30° in the counterclockwise direction.

FIG. 7 shows the sensing unit of FIG. 6*a* after it has undergone a 30° CCW angular displacement. As a result, the lower plates 63 and 64 (not shown) are partially uncovered while plates 65 and 66 (not shown) are partially covered by liquid 62. When the sensor unit is installed in an inclinometer such as shown in FIG. 4*a*, elements such as the wall segments 63, 64, 65, and 66 are constrained to move with assembly 41. The conductive liquid, although a part of the sensing unit, may move relative to the wall segments, assembly 41 and base 31.

Hysteresis in liquid filled sensing units, such as shown in FIG. 6 and disclosed in U.S. Pat. Nos. 4,624,140 and 3,906,471 are at least in part a result of surface tension of the liquid. The impact of surface tension on hysteresis may be diminished by causing the induced motion prior to or during the reading of the output to always be in the same direction. Alternatively, the effect of hysteresis may be diminished by vibrating the sensor unit as a whole. As yet another alternative, only a portion of the sensing unit, for example the conductive liquid, may be moved or agitated directly.

Figure 8A:
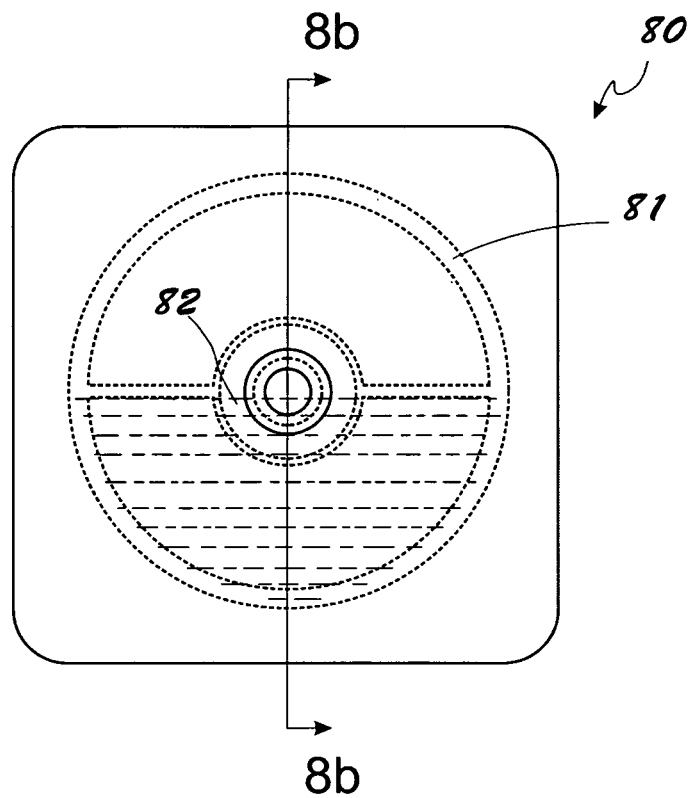
FIG. 8 is a schematic of a sensing unit with agitators for agitating a liquid component contained within the sensing unit.
Figure 8B:
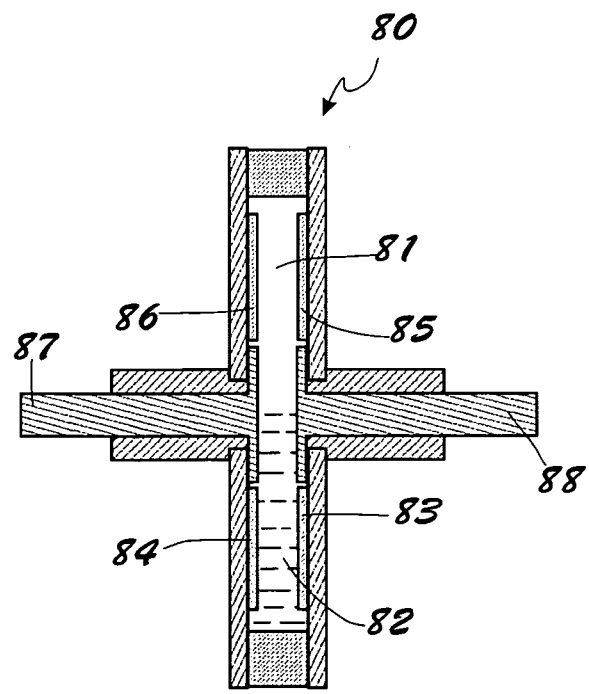

FIG. 8*a* shows a sensing unit 80 with vessel 81 partially filled with liquid 82. FIG. 8*b* shows a section of the sensor with conductive wall segments 83, 84, 85, and 86. Also shown are two pistons 87 and 88 that may be moved axially inward with axial actuators (not shown). The axial motion of these pistons is preferably initiated before the sensor reading is obtained and after the inclinometer containing the sensing unit has reached the position where a measurement is to be obtained. The disturbance induced by pistons 87 and 88 may also be oscillatory and continue even during the period when the measurement is taken. Alternatively, the liquid may be agitated by imparting motion or oscillations to a wall of the vessel that is configured to be flexible. The use of devices to directly cause a disturbance in the liquid may be used in conjunction with using devices to induce desired motions to the sensing unit as a whole.

Figure 9:
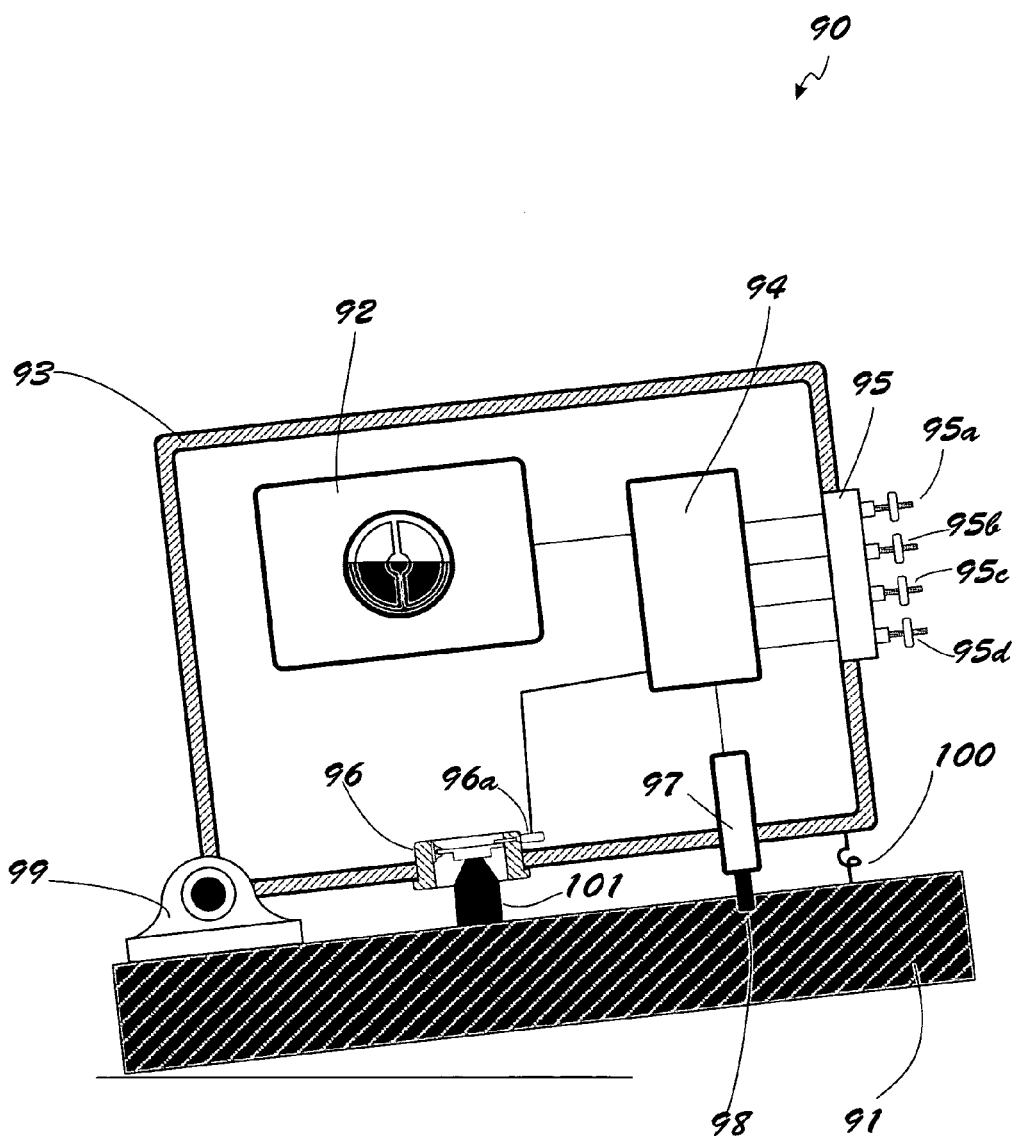
FIG. 9 is a schematic of a still further embodiment of the invention showing a sensor comprising a sensing unit and controller.

FIG. 9 shows a schematic of an inclinometer 90 configured according to yet another embodiment of the invention, comprising a sensor base 91 and sensing unit 92 and sensing unit assembly 93. The assembly 93 also comprises a controller 94, terminal strip 95, contact 96, and an actuator 97 with plunger 98. The movement of the assembly 93 with respect to the sensor base 91 is constrained by hinge 99, spring 100, and stop 101. When assembly 93 approaches base 91 sufficiently so that contact 96 touches stop 101, the relative motion of assembly 93 towards base 91 typically ceases. However, contact 96 may be configured so that assembly 93 may move closer than this point.

The controller is connected to a power terminal 95*a* and ground terminal 95*b*. The controller supplies power and monitors the sensing unit 92, the actuator 97, and input terminal 95*c*. Based on the output of the sensor unit 92, input commands obtained from terminal 95*c* and on board algorithms or empirical data, the controller causes the actuator to induce relative motion between the assembly 93 and base 91. The controller obtains the output from the sensor unit 92 after or during the induced motion and supplies an appropriate signal indicative of the inclination of base 91 to the output terminal 95*d*.

Contact 96 may be configured so that the controller may determine if there is physical contact between the stop 101 and contact 96. The device may also be configured so that the contact 96 may be disabled if it is desired that the assembly be moved closer to the base than the stop would otherwise allow. The contact device may be configured with a disabling mechanism 96*a* so that the controller may disable the contact device so that it does not engage the stop 101. In the embodiment in FIG. 9, if contact 96 is disabled by the controller, the motion of the assembly will be constrained by only hinge 99, actuator 97 and spring 100.

The plunger 98 of actuator 97 may be attached to base 91 so that the actuator can be used to push or pull on the base 91. The actuator may then be used to induce vibratory relative motion between the assembly and the base.

Figure 10:
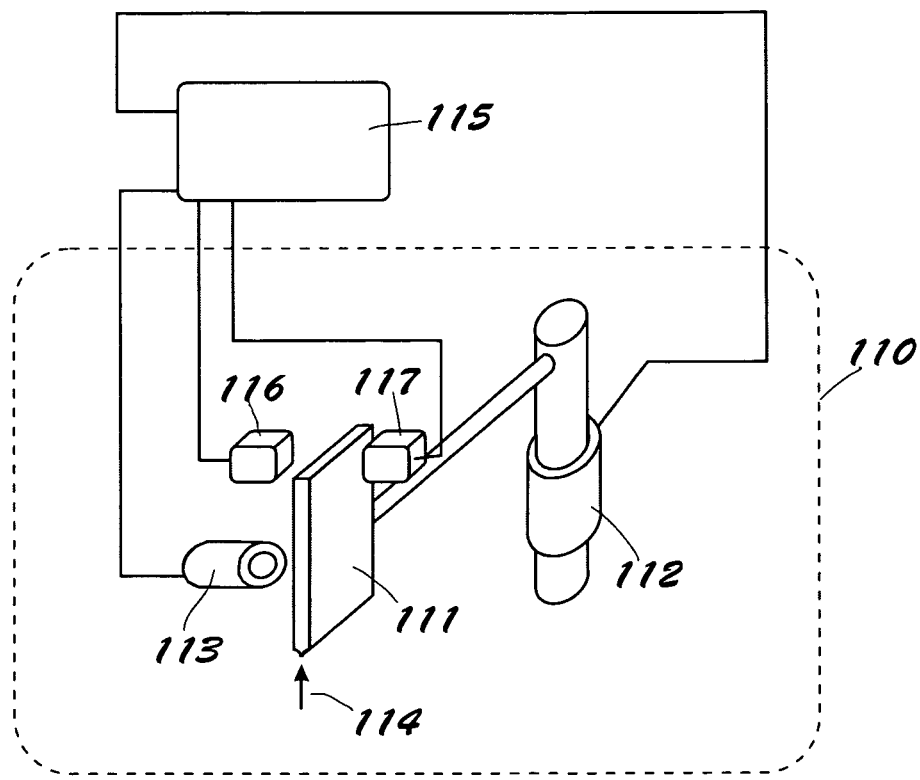
FIG. 10 is a schematic of a sensing unit comprising a servo inclination sensor with actuators configured according to another embodiment of the invention.

FIG. 10 shows a servo inclination sensing unit 110 comprising a pendulum mass 111, motor 112 and proximity sensor 113 arranged in a conventional fashion. This is another example of a sensing unit that may be used in a displacement sensor built according to this invention. Conventionally, when a sensing unit 110 is inclined, the position of the pendulum mass is altered as a result of the realignment of the mass 111 with respect to the direction of the gravitational field. The motor 112 then realigns the position of the mass 111 as measured by the proximity probe so that the position is returned to the undisturbed position 114 based on commands from the controller 115. The current supplied to the motor is proportional to and used as a measure of the displacement of the sensing unit 110.

To minimize the effect of hysteresis, an actuator (not shown) may be used to alter the angular position of the normally stationary motor 112 so that the motion of the pendulum mass always approaches the null position 114 from the same direction regardless of the direction of the overall sensor displacement. Alternatively, instead of using an actuator to modify the position of a normally fixed component of the sensing unit such as the motor 112, actuators 116 and 117 may be used to induce added motion in the mass 111 so that it always approaches the null point from the same direction regardless of the direction of the overall sensor displacement. Actuators 116 and 117 may be used, for example, to magnetically attract a mass 111, which may be at least partially made of iron. Alternatively, actuators 116 and 117 may be used to vibrate the mass 111 before or during the period that the output reading is obtained.

The invention has been described in terms of its functional principles and several illustrative embodiments. Many variants of these embodiments will be obvious to those of skill in the art based on these descriptions. Therefore, it should be understood that the ensuing claims are intended to cover all changes and modifications of the illustrative embodiments that fall within the literal scope of the claims and all equivalents thereof.

What I claim is:

1. A displacement sensor comprising:
   a base for attaching said sensor to other objects
   a displacement sensing unit
   an actuator for inducing relative motion between said sensing unit relative to said base.

2. The sensor according to claim 1, wherein said displacement sensing unit is adapted and configured to measure inclination.

3. The sensor according to claim 2, wherein said actuator comprises a piezoelectric stack, a cam mechanism, a worm gear, a rack and pinion device, a linear motor, a rotary motor or an electric, pneumatic or hydraulic jack.

4. The sensor according to claim 2, further comprising a controller configured to control the relative motion between said displacement sensing unit and said base.

5. The sensor according to claim 1, further comprising a controller configured to control the relative motion between said displacement sensing unit and said base.

6. The sensor according to claim 2 further comprising a hinge, a damper, a spring or a stop for constraining said motion.

7. The sensor according to claim 2 wherein said sensing unit is a liquid filled capacitive inclination measuring device.

8. A method for reducing the effect of hysteresis in a displacement sensor which comprises:
   providing a base for attaching said sensor to other objects
   providing a displacement sensing unit
   imparting relative motion between said base and said sensing unit.

9. An inclinometer comprising:
   a base for attaching inclinometer to another object
   a device for measuring inclination
   a mechanism for moving said device relative to said base.

10. The inclinometer according to claim 9, where said mechanism is an actuator for vibrating said device with respect to said base.

* * * * *